(12) United States Patent
Gage et al.

(10) Patent No.: US 9,873,438 B1
(45) Date of Patent: Jan. 23, 2018

(54) VEHICLE CONTROL UNIT AND METHOD TO IMPROVE VEHICLE FUEL EFFICIENCY BASED ON AN ACCELERATION PARAMETER

(71) Applicant: Toyota Motor Engineering & Manufacturing North America, Inc., Erlanger, KY (US)

(72) Inventors: Sergei I. Gage, Redford, MI (US); Arata Sato, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/224,556

(22) Filed: Jul. 31, 2016

(51) Int. Cl.
| *F02D 28/00* | (2006.01) |
| *B60W 50/14* | (2012.01) |
| *B60W 40/107* | (2012.01) |
| *B60W 50/16* | (2012.01) |

(52) U.S. Cl.
CPC .......... *B60W 50/14* (2013.01); *B60W 40/107* (2013.01); *B60W 50/16* (2013.01); *B60W 2050/143* (2013.01); *B60W 2050/146* (2013.01)

(58) Field of Classification Search
None
See application file for complete search history.

(56) References Cited

U.S. PATENT DOCUMENTS

| 9,352,750 | B2 | 5/2016 | Johansson et al. | |
| 2007/0095587 | A1* | 5/2007 | DuCharme | B60K 6/12 180/65.31 |
| 2010/0211259 | A1* | 8/2010 | McClellan | G07C 5/0816 701/31.4 |
| 2011/0221586 | A1* | 9/2011 | Eikelenberg | B60W 50/14 340/439 |
| 2012/0123665 | A1* | 5/2012 | Greenberg | C12P 7/06 701/110 |
| 2012/0191334 | A1* | 7/2012 | Kashio | G07C 5/0825 701/123 |
| 2015/0073692 | A1* | 3/2015 | Malikopoulos | B60W 50/14 701/123 |

OTHER PUBLICATIONS

NHTSA, "Fuel Economy Driver Interfaces: Design Range and Driver Opinions Report on Task 1 and Task 2", U.S. Department of Transportation, National Highway Traffic Safety Administration, Aug. 2009, 90 pages.

* cited by examiner

*Primary Examiner* — Brent Swarthout
(74) *Attorney, Agent, or Firm* — Christopher G. Darrow; Darrow Mustafa PC (57) ABSTRACT

Provided is a method and device for providing feedback for constant acceleration in a vehicle, which includes sampling velocity data at sample rate during an increase in a velocity rate over time to produce a plurality of sampled velocity data. An acceleration parameter is generated based on a difference of the sampled velocity data over a respective time interval. A determination is made as to whether the acceleration parameter indicates a constant acceleration. When the acceleration parameter does indicate a constant acceleration, a near real-time feedback signal is produced and announced to advise of the constant acceleration.

20 Claims, 7 Drawing Sheets

FIG. 1

FIG. 2
vehicle network 201

FIG. 3
vehicle control unit 200

FIG. 4
acceleration without near real-time feedback signal 203

FIG. 5
acceleration with near
real-time feedback signal

FIG. 6
acceleration with near real-time feedback signal 203

FIG. 7

VEHICLE CONTROL UNIT AND METHOD TO IMPROVE VEHICLE FUEL EFFICIENCY BASED ON AN ACCELERATION PARAMETER

BACKGROUND

Vehicle fuel price increases, either in the form of electricity and/or petroleum-based fuels, provides challenges in maximizing fuel efficiency to realize the best cost per distance traveled. Apart from a fuel-efficient design of a vehicle powertrain, an example to improve fuel efficiency is to correspondingly improve the vehicle operator's driving habits towards a less aggressive driving style. It is desirable to provide a driver feedback on their driving habits to improve a vehicle's fuel efficiency.

SUMMARY

A device and method for improving vehicle fuel efficiency based on feedback for a vehicle acceleration parameter are disclosed.

In one implementation, a method in a vehicle control unit is disclosed. The method includes operations for sampling velocity data at sample rate during an increase in a velocity rate over time $t_0$ produce a plurality of sampled velocity data. The method generates an acceleration parameter based on a difference of the sampled velocity data over a respective time interval. Proceeding, the method determines whether the acceleration parameter indicates a constant acceleration for a vehicle. When a constant acceleration is present, the method produces a near real-time feedback signal to advise of the constant acceleration, and announces the near real-time feedback signal.

In another implementation, a vehicle control unit is disclosed. The vehicle control unit may include a wireless communication interface, a processor, and a memory.

The wireless communication interface services communication with handheld user device of a vehicle user and with a vehicle network. The processor is coupled to the wireless communication interface and in communication with a vehicle speed sensor device, where the processor is for controlling operations of the vehicle control unit. The memory is coupled to the processor, and is for storing data and program instructions used by the processor.

The processor being configured to execute instructions stored in the memory to sample velocity data, produced by the vehicle speed sensor device, at a sample rate during an increase in a velocity rate over time $t_0$ produce a plurality of sampled velocity data and generate an acceleration parameter based on a difference of the sampled velocity data over a respective time interval. The processor is operable to determine whether the acceleration parameter indicates a constant acceleration for a vehicle. When the constant acceleration is present, the processor produces a near real-time feedback signal to advise of the constant acceleration, and announces the near real-time feedback signal via the wireless communication interface.

BRIEF DESCRIPTION OF THE DRAWINGS

The description makes reference to the accompanying drawings wherein like reference numerals refer to like parts throughout the several views, and wherein.

DETAILED DESCRIPTION

Generally, fuel-efficient driving habits of a vehicle operator have been based on their traveling speed, or velocity. For example, the vehicle fuel-efficiency correspondingly falls as the traveling velocity increases. That is, fuel efficiency is greater traveling at 30 mph (48 km/h) than at 80 mph (128 km/h).

With respect to vehicle acceleration, by analogy, the greater fuel efficiency was considered to be achievable at a lower rate of acceleration as opposed to a higher rate of acceleration. However, acceleration rate does not affect fuel efficiency. Instead, whether the acceleration is constant determines whether fuel efficiency is improved.

Vehicles generally include feedback for fuel efficient driving habits. For example, during constant velocity (such as moderate highway speed), a visual indicator lights (such as in the vehicle instrument cluster) to provide the operator feedback that they are driving in a fuel efficient manner. However, when the amount of acceleration exceeds an upper limit (for example, depressing the accelerator pedal to the vehicle floor), the visual indicator turns off, as well as when the vehicle velocity exceeds a moderate highway speed (for example, about 80 mph (130 km/h)).

Figure 1:
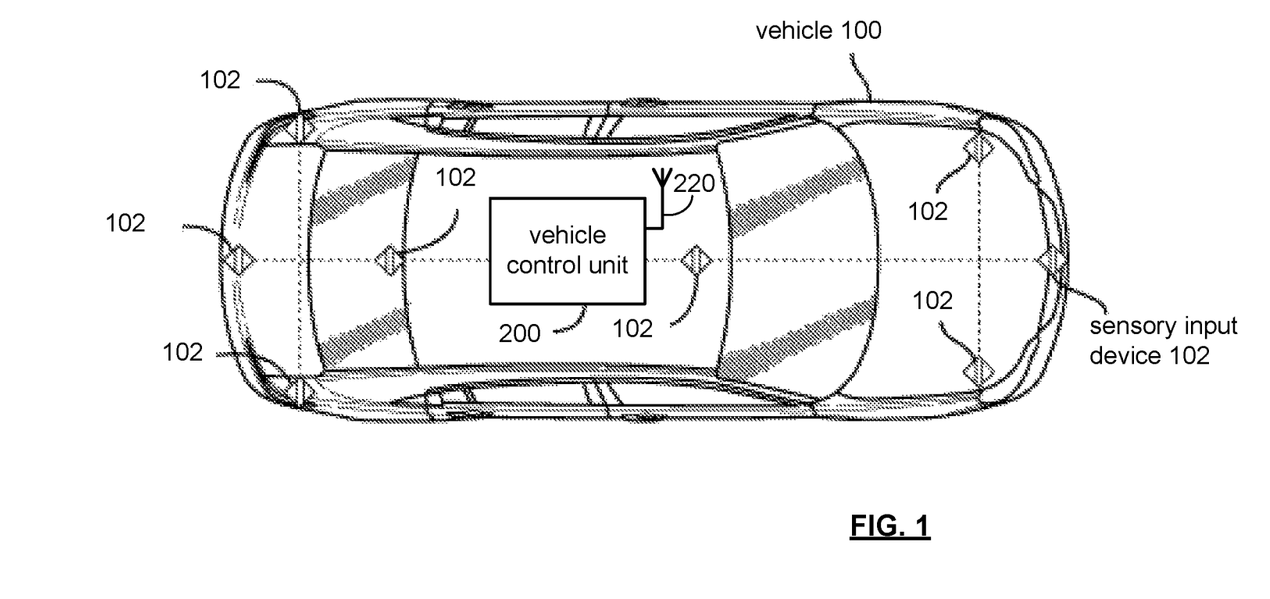
FIG. 1 is a schematic illustration of a vehicle including a vehicle control unit.

FIG. 1 is a schematic illustration of a vehicle 100 including a vehicle control unit 200. A plurality of sensor devices 102 are in communication with the control unit 200.

The plurality of sensor devices 102 can be positioned on the outer surface of the vehicle 100, or may be positioned in a concealed fashion for aesthetic purposes with regard to the vehicle. Moreover, the sensors may operate at frequencies in which the vehicle body or portions thereof appear transparent to the respective sensor device. Communication between the sensors may be on a bus basis, and may also be used or operated by other systems of the vehicle 100. For example, the sensors devices 102 may be coupled by a combination of network architectures such as a Body Electronic Area Network (BEAN), a Controller Area Network (CAN) bus configuration, an Audio Visual Communication-Local Area Network (AVC-LAN) configuration, and/or other combinations of additional communication-system architectures to provide communications between devices and systems of the vehicle 100. Moreover, the sensor devices 102 may be further coupled to the vehicle control unit 200 via such communication-system architectures.

The sensor devices 102 operate to monitor ambient conditions relating to the vehicle 100, including audio, visual, and tactile changes to the vehicle environment.

One or more of the sensor devices 102 can be configured to capture changes in velocity, acceleration, and/or distance to these objects in the ambient conditions of the vehicle 100, as well as an angle of approach. The sensor devices 102 may be provided by a Light Detection and Ranging (LIDAR) system, in which the sensor devices 102 may capture data related to laser light returns from physical objects in the environment of the vehicle 100. The sensor devices 102 may also include a combination of lasers (LIDAR) and milliwave radar devices.

In various driving modes, the examples of the placement of the sensor devices 102 may provide for blind-spot visual sensing (such as for another vehicle adjacent the vehicle 100) relative to the vehicle user, and for forward periphery visual sensing (such as for objects outside the forward view of a vehicle operator, such as a pedestrian, cyclist, etc.).

The vehicle 100 can also include options for operating in manual mode, autonomous mode, and/or driver-assist mode. When the vehicle 100 is in manual mode, the driver manually controls the vehicle systems, which may include a propulsion system, a steering system, a stability control system, a navigation system, an energy system, and any other systems that can control various vehicle functions (such as the vehicle climate or entertainment functions, etc.). The vehicle 100 can also include interfaces for the driver to interact with the vehicle systems, for example, one or more interactive displays, audio systems, voice recognition systems, buttons and/or dials, haptic feedback systems, or any other means for inputting or outputting information.

In an autonomous mode of operation, a computing device, which may be provided by the vehicle control unit 200, or in combination therewith, can be used to control one or more of the vehicle systems without the vehicle user's direct intervention. Some vehicles may also be equipped with a "driver-assist mode," in which operation of the vehicle 100 can be shared between the vehicle user and a computing device.

For example, the vehicle operator can control certain aspects of the vehicle operation, such as steering, while the computing device can control other aspects of the vehicle operation, such as braking and acceleration. When the vehicle 100 is operating in autonomous (or driver-assist) mode, the computing device, such as the vehicle control unit 200, issues commands to the various vehicle systems to direct their operation, rather than such vehicle systems being controlled by the vehicle user.

As shown in FIG. 1, the vehicle control unit 200 is configured to provide wireless communication with a user device through the antenna 220, other vehicles (vehicle-to-vehicle), and/or infrastructure (vehicle-to-infrastructure), or with devices through a network cloud, which is discussed in detail with respect to FIGS. 2-7.

Figure 2:
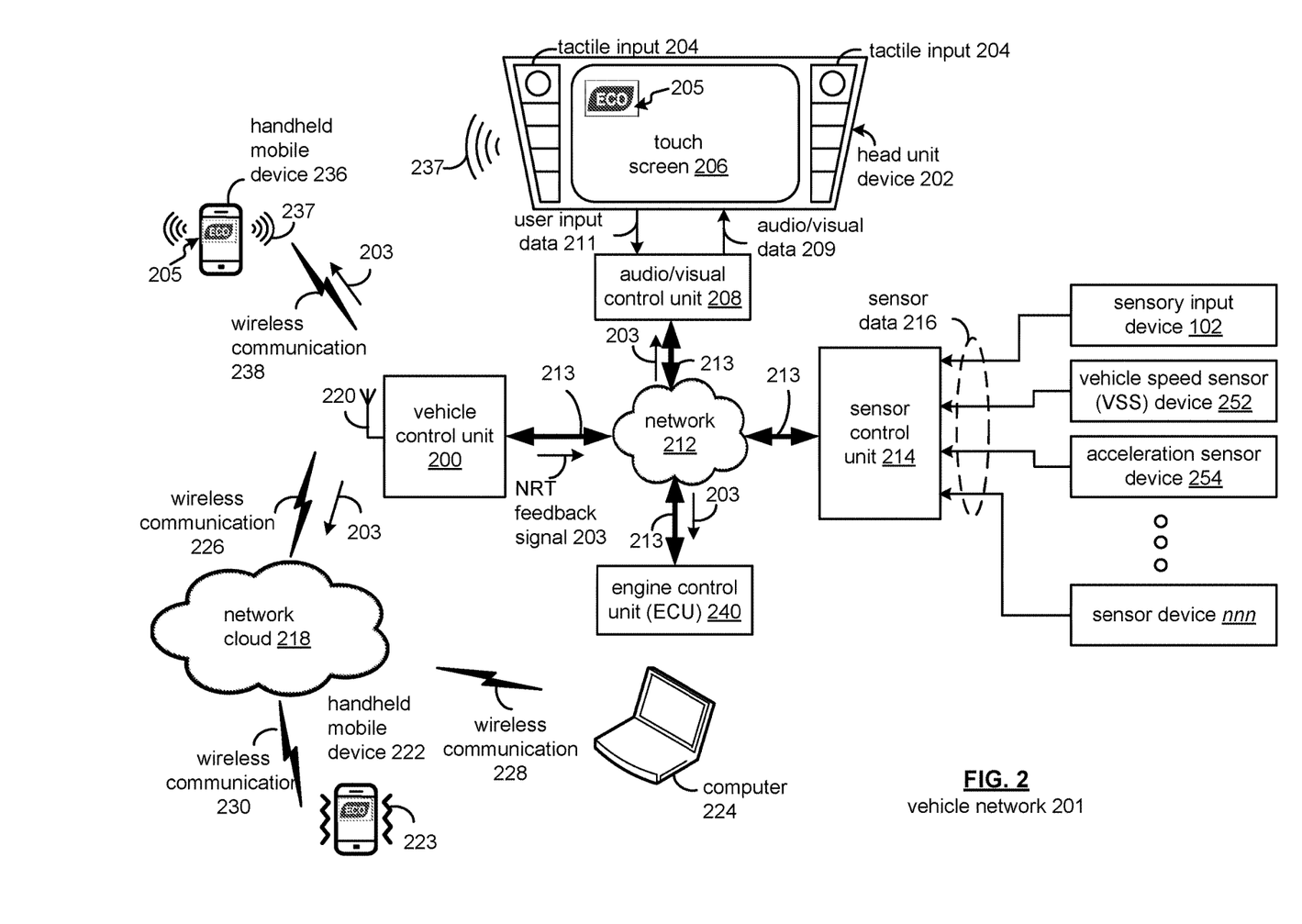
FIG. 2 shows a block diagram of the vehicle control unit of FIG. 1 in the context of a vehicle network environment.

Referring now to FIG. 2, a block diagram of the vehicle control unit 200 in the context of a network environment is provided. While the vehicle control unit 200 is depicted in abstract with other vehicular components, the vehicle control unit 200 may be combined with the system components of the vehicle 100 (see FIG. 1). Moreover, the vehicle 100 may also be an automobile or any other passenger or non-passenger vehicle such as, for example, a terrestrial, aquatic, and/or airborne vehicle.

As shown in FIG. 2, a vehicle network 201 may include the vehicle control unit 200, an audio/visual control unit 208, a sensor control unit 214, and an engine control unit 240, that are communicatively coupled via a network 212 and communication paths 213.

The vehicle control unit 200 may communicate with a head unit device 202 via a communication path 213 and network 212, and may also communicate with the sensor control unit 214 to access sensor data 216 from sensor devices 102, 252, 254 and/or nnn. The vehicle control unit 200 may also be wirelessly coupled with a network cloud 218 via the antenna 220 and wireless communication 226, as well as via a wireless communication 238 to handheld user devices such as handheld mobile device 236 (for example, cell phone, a smart phone, a personal digital assistant (PDA) devices, tablet computer, e-readers, etc.).

In this manner, the vehicle control unit 200 operates to receive input data, such as sensor data 216, and provide data, to the head unit device 202 via the audio/visual control unit 208, to the sensor control unit 214, and to other devices that may communicatively couple via the network 218, such as computer 224, handheld mobile device 222 (for example, cell phone, a smart phone, a personal digital assistant (PDA) devices, tablet computer, e-readers, etc.).

The vehicle control unit 200 and the audio/visual control unit 208 may be communicatively coupled to receive the sensor data 216 from the sensor control unit 214, including data values relating to fuel consumption information.

The vehicle control unit 200 may provide data such as a near real-time feedback signal 203 to indicate fuel efficient operation of the vehicle 100 to a vehicle operator. The signal 203 may be announced by example by displaying a visual indicator 205, by providing a haptic indication 223, and/or by providing an audible indication 237 to the vehicle operator, such as through head unit device 202, handheld mobile devices 222 and/or 236, computer 224, a combination of devices thereof, etc.

The use of the term "near real-time" or (NRT) refers to time delay that may be introduced, by the vehicle control unit 200 processing velocity data from the VSS device 252, and/or time delay that may be introduced by transmission of the velocity data over the vehicle network 20, and transmission of the NRT feedback signal 203, etc., between the occurrence of an event (that is, sensing instantaneous velocity of the vehicle), and the use of NRT feedback signal 203 by the vehicle operator.

As discussed in detail herein, the vehicle control unit 200 operates to promote and/or improve fuel efficiency of the vehicle 100 through providing near real-time feedback 203. The near real-time feedback is based upon promoting a constant acceleration while moving from a first velocity through to a second velocity. As noted, whether amount of acceleration (that is, faster or slower) does not appreciably affect fuel efficiency, but greater fuel efficiency may be recognized by maintaining the acceleration at a constant rate, as is discussed in detail with reference to FIGS. 4-7.

The visual indicator 205 may also be provided via a conventional instrument cluster assembly of the vehicle, such as an indicator light (LED, LCD, backlit, etc.), graphic icon, etc. An example of such a visual indicator 205 is an "eco driving indicator light" that illuminates during eco-friendly operation.

Still referring to FIG. 2, the audio/visual control unit 208 operates to provide, for example, audio/visual data 209 for display to the touch screen 206, as well as to receive user input data 211 via a graphic user interface. The audio/visual data 209 and input data 211 may include audio data, hands-free phone data, voice control data, navigation data, USB connection data, DVD play function data, multifunction meter function data, illumination signal data for the display (such as dimming control), driving status recognition data (such as vehicle speed, reverse, etc. via sensor data 216), composite image signal data (such as data via sensor devices 102), etc.

In FIG. 2, the head unit device 202 may include tactile input 204 and a touch screen 206. The touch screen 206 operates to provide visual output or graphic user interfaces such as, for example, maps, navigation, entertainment, information, infotainment, and/or combinations thereof.

The touch screen 206 may include mediums capable of transmitting an optical and/or visual output such as, for example, a cathode ray tube, a light emitting diode, a liquid crystal display, a plasma display, or other two dimensional or three dimensional display that displays graphics, text or video in either monochrome or color in response to display data 209.

Moreover, the touch screen 206 may, in addition to providing visual information, detect the presence and location of a tactile input upon a surface of or adjacent to the display. Additionally, it is noted that the touch screen 206 can include at least one or more processors and one or more memory modules to support the operations described herein.

The head unit device 202 may also include tactile input and/or control inputs such that the communication path 213 communicatively couples the tactile input to other control units and/or modules of the vehicle 100 (FIG. 1). The tactile input data may provided by devices capable of transforming mechanical, optical, or electrical signals into a data signal capable of being transmitted via the communication path 213.

The tactile input 204 may include number of movable objects that each transform physical motion into a data signal that can be transmitted over the communication path 213 such as, for example, a button, a switch, a knob, a microphone, etc.

The touch screen 206 and the tactile input 204 may be combined as a single module, and may operate as an audio head unit or an infotainment system of the vehicle 100. The touch screen 206 and the tactile input 204 can be separate from one another and operate as a single module by exchanging signals via the communication path 213 via audio/visual data 209 and/or user input data 211.

The head unit device 202 may provide information regarding vehicle operation conditions based on display data 209 from the audio/visual control unit 208. Moreover, the head unit device 202 may provide such information to other monitor devices for the vehicle 100, such as a heads-up display (not shown), or to an instrument cluster in the vehicle dash assembly behind the vehicle steering wheel.

The audio/visual control unit 208 operates to receive user input data 211, and provides display data 209. The display data 209 may include operational information based on the sensor data 216.

The sensor control unit 214 provides access to sensor data 216 of the sensor devices 102, vehicle speed sensor (VSS) device 252, accelerometer sensor device 254, sensor device nnn, etc.

The VSS device 252 operates to measure transmission/transaxle output and/or wheel speed to produce velocity data. The VSS device 252 provides this information to modify engine functions, such as ignition timing, transmission shift points, etc. The VSS device 252 may further operate to provide velocity data to the vehicle control unit 200, which may be sampled at a sample rate during an increase in a velocity rate over time $t_0$ produce sampled velocity data.

Generally, speed or velocity is the distance traveled divided by the time it takes. For example, when a distance of 200 kilometers (124 miles) takes four hours to do so, the average speed is 50 kilometers per hour (31 mph).

For affecting fuel efficiency, the instantaneous speed, which is the speed of the vehicle at a given moment, is sampled during an increase in the velocity rate of time is processed and generates an acceleration parameter. A near real-time feedback signal 203 is based on a state (constant or variable) of the acceleration parameters during the acceleration.

With respect to sensing velocity, the VSS device 252 may be, for example, based upon magnetic components on a rotating drive shaft that are detected by magnetic sensors (for example, reed switches, Hall-effect sensors, etc.). Each pass generates a brief electric current pulse. The sensor control unit 214 counts the rate the current pulses arrive and converts the signal into velocity data, which may be displayed by an instrument cluster. The vehicle control unit 200 samples the velocity data to assess the nature of an acceleration rate (constant or variable) and produces a near real-time feedback signal to advise when constant acceleration is attained.

The accelerometer sensor device 254 operates to sense proper acceleration of the vehicle 100 in terms of g-force, but not coordinate acceleration (that is, a rate of change of velocity). Such changes in g-force may operate to sense, generally, an increase in the velocity rate over time, as a precursor to a vehicle operator applying an acceleration to an increase in vehicle velocity.

As may be appreciated, accelerometer are generally impracticable for velocity estimation or vehicle acceleration estimation. Accelerometers generally operate to sense a change in force, based on the principle of force equals mass times acceleration.

For example, to perhaps use an accelerometer for the purpose of velocity estimation, the device must first be installed with an exceedingly high degree of accuracy so that gravity measurements may be distinguished from the physical acceleration of the device.

Accordingly, with respect to the embodiments discussed herein, the accelerometer sensor device 254 may be used to sense general force changes to the vehicle 100, and to provide a point to monitor a vehicle's instantaneous velocity to provide feedback to affect the nature of the acceleration applied.

For example, while at a stop (where velocity is zero) or at constant speed (when velocity is generally unchanged over time), the accelerometer sensor device 254 senses a zero g-force. When an increase in a velocity rate over time occurs, however, the accelerometer sensor device 254 senses a non-zero g-force, where the g-force is greater than zero. In this regard, the accelerometer sensor device 254 provided sensor data 216 for the vehicle control unit 200 to detect the nature of an acceleration by a vehicle user.

The accelerometer sensor device 254 may be implemented, for example, as a capacitative accelerometer, a piezoelectric accelerometer, a semiconductor accelerometer, a Hall-effect accelerometer, etc. Generally, the acceleration sensor device 254 may be provided by a device capable of sensing forces (that is, force equals mass times acceleration) exerted on the vehicle 100 by a change in acceleration (such as changing from a stationary position, moving from a first velocity to a second velocity, etc.).

The sensor data 216 may also operate to permit object detection external to the vehicle, such as for example, other vehicles (including vehicles occupying a parking location), roadway obstacles, traffic signals, signs, trees, etc. Accordingly, the sensor data 216 allows the vehicle 100 (see FIG.

1) to assess its environment in order to maximize safety for vehicle passengers and objects and/or people in the environment.

The engine control unit (ECU) 240 may communicate with a head unit device 202 via a communication path 213 and network 212, and may also communicate with the sensor control unit 214 to access sensor data 216 from sensor devices 102, 252, 254 and/or nnn.

The engine control unit 240 may function to control internal combustion engine actuators to obtain a desired engine performance. The engine control unit 240 operates to read the sensor data 216, interpret the sensor data 216 based on multidimensional performance maps or lookup tables, and adjust the engine actuators accordingly.

For example, desired engine performance may be based on operational modes, including an economy mode, a sport mode, a drive mode, etc. The economy mode operates to mimic efficient driver behavior to improve fuel economy by adjusting the vehicle torque map, shift schedule, torque filtering, idle rpm speed, etc. The economy mode may be further improved with influencing the nature of the vehicle acceleration.

In addition to the providing a near real-time feedback signal 203 to affect a vehicle operator's acceleration behavior, the near real-time feedback signal 203 may be implemented by the engine control unit 240 to also produce a constant acceleration when the vehicle 100 may be in an economy mode while operating in a manual mode, autonomous mode, and/or driver-assist mode. The near real-time feedback signal 203 may also present an indication to the vehicle operator as described herein to verify and/or confirm a fuel efficient mode of operation by the vehicle 100.

As may be appreciated, the communication path 213 of the vehicle network 201 may be formed by a medium suitable for transmitting a signal such as, for example, conductive wires, conductive traces, optical waveguides, or the like. Moreover, the communication paths 213 can be formed from a combination of mediums capable of transmitting signals.

The communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

The term "signal" relates to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

The wireless communication 226, 228 and/or 230 of the network cloud 218 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, ZigBee, and/or variations thereof.

As is noted above, the vehicle control unit 200 may be communicatively coupled to a computer 224 via wireless communication 228, a handheld mobile device 222 via wireless communication 230, etc.

As described in detail, application data may be provided to the vehicle control unit 200 from various applications running and/or executing on wireless platforms of the computer 224, the handheld mobile device 222 and 236, as well as from the head unit device 202 via the network 212.

The handheld mobile device 222 and/or computer 224, by way of example, may be a device including hardware (for example, chipsets, processors, memory, etc.) for communicatively coupling with the network cloud 218, and also include an antenna for communicating over one or more of the wireless computer networks described herein.

Figure 3:
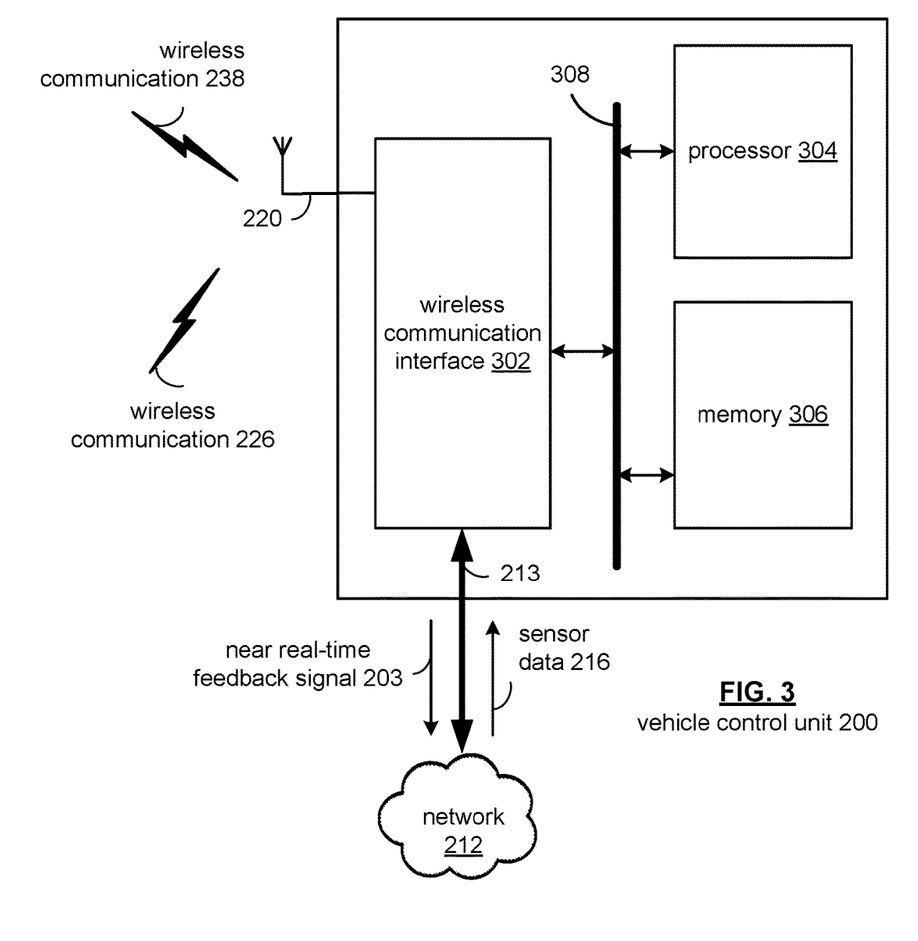
FIG. 3 shows a block diagram of the vehicle control unit of FIGS. 1 and 2.

FIG. 3 is a block diagram of a vehicle control unit 200, which includes a wireless communication interface 302, a processor 304, and memory 306, that are communicatively coupled via a bus 308.

The processor 304 in the control unit 200 can be a conventional central processing unit or any other type of device, or multiple devices, capable of manipulating or processing information. As may be appreciated, the processor 304 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element 306 may be a single memory device, a plurality of memory devices, and/or embedded circuitry of the processor 304. Such a memory device may be a read-only memory, random access memory, volatile memory, non-volatile memory, static memory, dynamic memory, flash memory, cache memory, and/or any device that stores digital information. The memory 306 is capable of storing machine readable instructions such that the machine readable instructions can be accessed by the processor 304. The machine readable instructions can comprise logic or algorithm(s) written in programming languages, and generations thereof, (e.g., 1GL, 2GL, 3GL, 4GL, or 5GL) such as, for example, machine language that may be directly executed by the processor 304, or assembly language, object-oriented programming (OOP), scripting languages, microcode, etc., that may be compiled or assembled into machine readable instructions and stored on the memory 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 304 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor 304 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor 304 executes, hard coded and/or operational instructions corresponding to at least some of the steps and/or functions illustrated in FIGS. 1-7 to assess a nature of a vehicle acceleration and to provide near real-time feedback features and methods described herein.

The wireless communications interface 302 generally governs and manages the vehicle user input data via the network 212 over the communication path 213 and/or wireless communication 226. The communication interface 302 also manages controller unit output data such as display data and/or parking status data to the vehicle user. There is no restriction on the present disclosure operating on any particular hardware arrangement and therefore the basic features herein may be substituted, removed, added to, or otherwise modified for improved hardware and/or firmware arrangements as they may develop.

The sensor data 216 (see FIG. 2) includes capturing of intensity or reflectivity returns of the environment surrounding the vehicle, instantaneous vehicle speed data, and acceleration data for determining acceleration state for providing feedback to improve vehicle fuel efficiency. In general, data 216 captured by the sensor devices 102, 252, 254 and/or nnn and provided to the vehicle network 201 via the communication path 213 can be used by one or more of applications of the vehicle to assess acceleration state(s) of the vehicle 100, and to provide the near real-time feedback signal 203.

The antenna 220, with the wireless communications interface 302, operates to provide wireless communications with the vehicle control unit 200, including wireless communication 226.

Such wireless communications range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

The structure of the vehicle control unit 200 may also be used as an acceptable architecture of the audio/visual control unit 208, the sensor control unit 214, engine control unit (ECU) 240, and other control units that may be included in the vehicle network 201 (see FIG. 2). The control units 200, 208, 214, and 240 may each include a communication interface, a processor, and memory that may be communicatively coupled via a data bus. As may be appreciated, other architectures may be implemented, with similar functional capabilities.

The processors for the control units 200, 208, 214 and 240 may be a conventional central processing unit or any other type of device, or multiple devices, capable of manipulating or processing information. As may be appreciated, the processor may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory and/or memory element for the control units 200, 208, 214 and 240 may be a single memory device, a plurality of memory devices, and/or embedded circuitry of the processor related to the control units 200, 208, 214 and 240. Such a memory device may be a read-only memory, random access memory, volatile memory, non-volatile memory, static memory, dynamic memory, flash memory, cache memory, and/or any device that stores digital information.

Note that if the processor for each of the control units 200, 208, 214 and 240 includes more than one processing device, the processing devices may be centrally located (e.g., directly coupled together via a wired and/or wireless bus structure) or may be distributed located (e.g., cloud computing via indirect coupling via a local area network and/or a wide area network). Further note that when the processor for each of the control units 200, 208, 214 and 240 may implement one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processor (e.g., the processor 304) executes, hard coded and/or operational instructions corresponding to at least some of the steps and/or functions illustrated in FIGS. 1-7 to perform human-machine interface features and methods described herein.

The communications interface for each of the control units 200, 208, 214 and 240 generally governs and manages the user input data received via the network 212, and outbound data to/from the vehicle control unit 200, respectively. There is no restriction on the present disclosure operating on any particular hardware arrangement and therefore the basic features herein may be substituted, removed, added to, or otherwise modified for improved hardware and/or firmware arrangements as they may develop.

Figure 4:
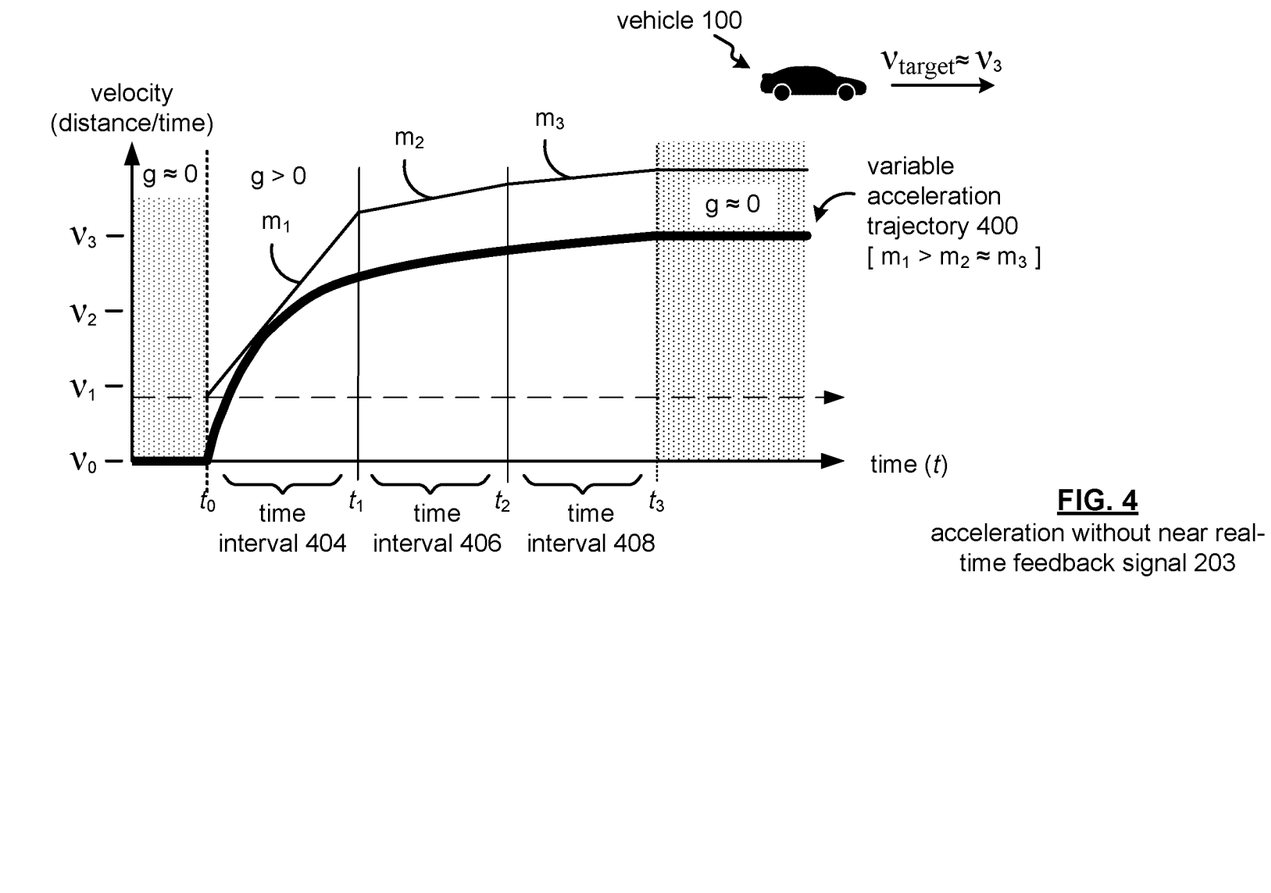
FIG. 4 is an example velocity-time graph illustrating a variable acceleration trajectory for a vehicle.

FIG. 4 is an example velocity-time graph illustrating a variable acceleration trajectory 400 for a vehicle 100 without the near real-time feedback signal 203 indicating a constant acceleration. In the example of FIG. 4, though an accelerator pedal for the vehicle 100 may be constantly pressed, the vehicle's velocity (indicated by the vertical axis) does not continue to increase over time (horizontal axis), and the resulting acceleration is variable over the span of moving from a first velocity $V_0$ to a second velocity $V_3$. The accelerator pedal for the vehicle functions to control a vehicle fuel throttle to increase, or accelerate, the vehicle to a desired velocity. The accelerator coupling to the fuel throttle may be an electronic throttle control, a mechanical linkage, optical throttle control, etc.

Factors slowing the rate of acceleration may include aerodynamic drag on the vehicle, road friction, component friction, engine efficiency, etc., as the vehicle 100 approaches a target speed $V_{target}$, which in the present example, is $V_3$. The variable acceleration trajectory 400 is a general example of the acceleration behavior.

The feedback signal 203 operates to affect vehicle operation to improve fuel efficiency by applying a constant acceleration rate. The feedback signal 203 permits a vehicle operator, responsive to the feedback signal 203, to manipulate accelerator controls to maintain a desirable constant acceleration rate.

In the alternative, the feedback signal 203 may be applied for engine control input, such as through an engine control unit 240, which operates to perform engine management functions affecting vehicle performance, as discussed in detail with reference to FIG. 2.

In the example of FIG. 4, the acceleration parameters are generated for each of the time interval 404, 406, and 408, during the increase in the velocity rate from first velocity $V_0$ to a second velocity $V_3$. As may be appreciated the time interval 404 may be considered an interval may be considered an initial or first time interval, and the remaining time intervals as subsequent (or second interval, third interval, etc.) with respect to the initial or first time interval 404.

An acceleration sensor device 254 senses the increase in the velocity rate over time by the period before to, when the vehicle 100 is stopped ($V_0$ is zero). The acceleration sensor device 254 senses motion of the vehicle because a force exerted by placing the vehicle 100 in motion produces a g-force greater than zero.

The time intervals 404, 406 and 408 are scalable, and may be configured based on driving habits of the vehicle operator. They may be predetermined at time intervals sufficient to determine the constant or variable state of the operator's acceleration during a transition from a first velocity to a second velocity. Habitually conservative acceleration may have longer time intervals sufficient to sample velocity data, while habitually dynamic acceleration may have shorter time intervals sufficient to sample the velocity data. In instances in which a vehicle driver does not have an acceleration tendency or habit for either acceleration rates, the time intervals may be dynamically adjusted based on the acceleration applied, as discussed in detail with reference to FIGS. 5-7.

Also, as may be appreciated, the number of time intervals 404, 406 and 408 are provided for example purposes, because the vehicle control unit 200 does not have a priori knowledge for the vehicle operator's final velocity value, $V_{target}$. In this manner, the near real-time feedback signal 203 is based upon instantaneous velocity data, which is sampled by the vehicle control unit, and used to determine whether the vehicle 100 achieves constant acceleration on a transition from an initial velocity $V_0$ to a target velocity $V_{target}$.

Still referring to FIG. 4, the acceleration parameter $m_1$ for the time interval 404 from time $t_0$ to time $t_1$ depicts an initial fast rate of positive acceleration (that is, a positive acceleration parameter, as contrasted with a declaration or negative acceleration parameter). For clarity, the resulting acceleration parameters for the variable acceleration trajectory 400 are shifted upwards along the dotted line parallel to the horizontal axis. The acceleration parameter $m_2$ for the time interval 406 from time $t_1$ to time $t_2$ levels out in contrast to the acceleration parameter $m_1$, indicating a slower rate of acceleration. That is, the acceleration parameter $m_1$ is not similar/equal to the acceleration parameter $m_2$, indicating variable and/or non-constant acceleration of the acceleration trajectory 400.

The acceleration parameter $m_3$ for the time interval 408 from time $t_2$ to time $t_3$ further levels out in contrast to the acceleration parameter $m_2$, indicating a yet slower rate of acceleration. With respect to the different between the acceleration parameter $m_2$ to acceleration parameter $m_3$ may be within a selected tolerance, and effectively be similar to one another, the assessment of acceleration parameters m1, m2 and m3 indicate variable acceleration ($m_1 > m_2 \approx m_3$).

During the increase in the velocity rate from time $t_0$ to time $t_3$, the resulting non-uniform acceleration is in a variable state. In the example of FIG. 4, the vehicle control unit 200 would not produce a near real-time feedback signal advising of a constant acceleration.

Figure 5:
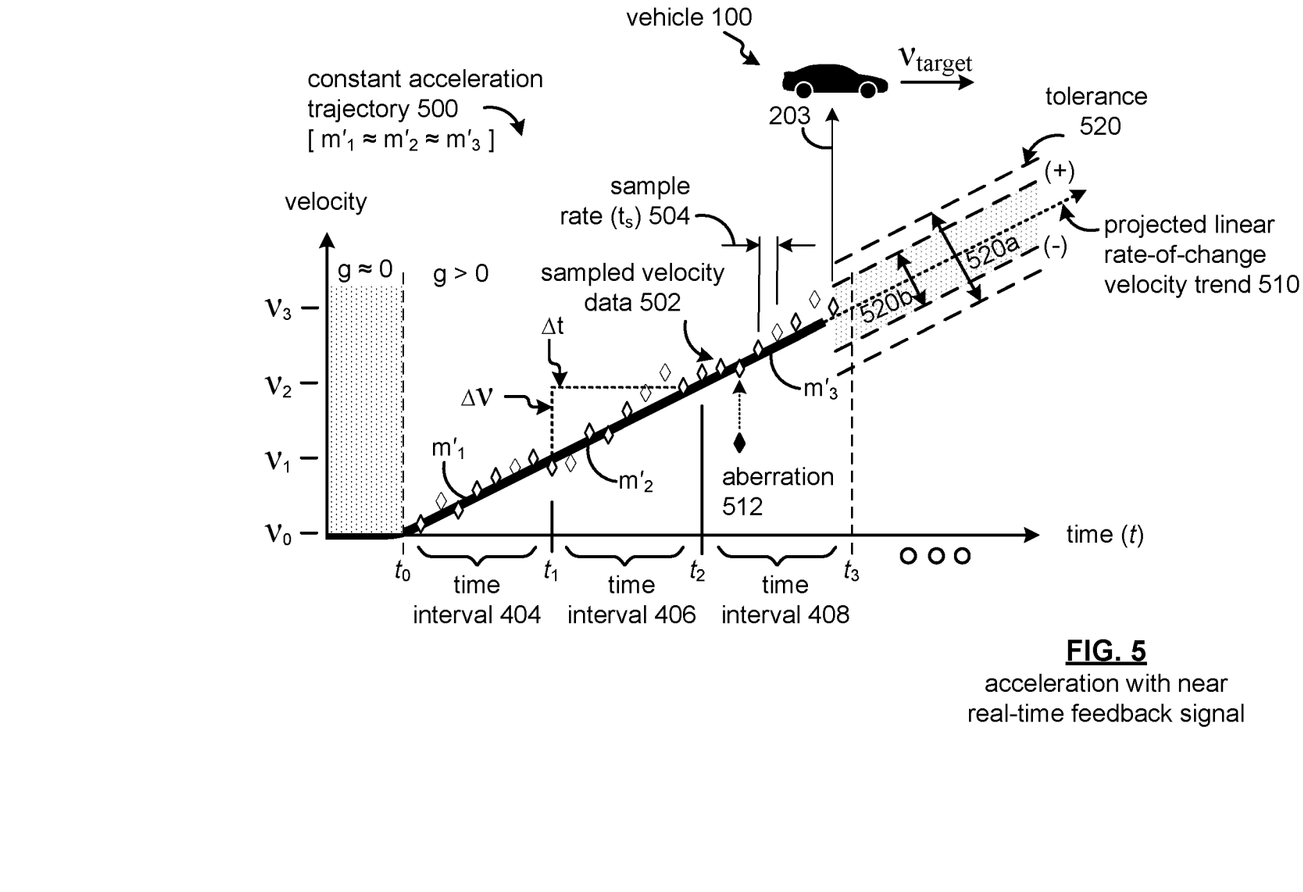
FIG. 5 is an example velocity-time graph illustrating a constant acceleration trajectory for a vehicle with the near real-time feedback signal indicating a constant vehicle acceleration.

FIG. 5 is an example velocity-time graph illustrating a constant acceleration trajectory 500 for a vehicle 100 with the near real-time feedback signal 203 indicating a constant vehicle acceleration.

FIG. 5 illustrates sampled velocity data 502 plotted to the velocity-time graph, which is sampled during an increase in the velocity rate of the vehicle 100.

In the example of FIG. 5, the vehicle 100 begins from a beginning velocity of $V_0$. An acceleration sensor device 254 senses a transition in force from a g-force of approximately zero Newtons to a g-force greater than zero Newtons.

During the increase in the velocity rate, vehicle control unit 200 generates acceleration parameters $m'_1$, $m'_2$ and $m'_3$, which each acceleration parameter $m'_1$, $m'_2$ and $m'_3$, reflects a difference of the sampled velocity data over the respective time interval. The slope value of the acceleration parameter indicates the rate of acceleration for the vehicle 100 over time.

For determining whether a constant acceleration is occurring for the trajectory 500, the acceleration parameters $m'_1$, $m'_2$ and $m'_3$ may be compared with one another as they are generated by the vehicle control unit. For the example of FIG. 5, the acceleration parameters $m'_1$, $m'_2$ and $m'_3$ approximate one another, indicating a constant acceleration. Based on this determination, the vehicle control unit produces the near real-time feedback signal 203 to advise of the constant acceleration.

With respect to time t, the feedback signal 203 may be produced upon a first occurrence of attaining constant acceleration, such as when the vehicle control unit 200 determine that acceleration parameters $m'_1$ and $m'_2$ indicate constant acceleration (at or about time $t_2$), as well as that acceleration parameters $m'_2$ and $m'_3$ (or all generated acceleration parameters $m'_1$, $m'_2$ and $m'_3$) indicate constant acceleration (at or about time $t_3$).

In the alternative, the vehicle control unit 200 may determine that the each of the acceleration parameters $m'_1$, $m'_2$ and $m'_3$, separately or in combination, indicate a constant acceleration based on a trend-line model. A trend-line model operates to minimize the sum of squared deviations from the sampled velocity data 502 measured in the vertical or "velocity" direction on a permissible tolerance.

For example, the vehicle control unit 200 generates a projected linear rate-of-change velocity trend 510 based on historic sampled velocity data 502 (for example, sampled velocity data during either or both of the time intervals 404 and 406). An R-squared, or tolerance 520, minimizes or tolerates deviations in the spread of the sampled velocity data 502 with respect to the velocity trend 510.

As may be appreciated, when the vehicle control unit 200 initially places too tight tolerance to the velocity trend 510, a vehicle operator may be able to sufficiently operate the accelerator controls to come within the tolerance 520. Frustration may result from not receiving a near real-time feedback signal 203 indicating constant acceleration (and also, may be considered inoperative without ever receiving a positive feedback signal).

Accordingly, the vehicle control unit 200 may initially (based on a reset mode, a "learning mode" from user input data 211, etc.) loosens the tolerance to a permissive tolerance 520a. As the vehicle operator becomes adept at managing the nuances of the accelerator controls, the vehicle control unit 200 tightens the tolerance 520 to a tolerance 520b the operator refines their acceleration operation to further improve fuel efficiency for the vehicle 100.

To also improve the modeling, the vehicle control unit 200 may normalize the sampled velocity data 502. Normalizing the sampled velocity data 502 operates to minimize aberrations indicated by aberration data 512 in the velocity data under different operational conditions of the vehicle 100. The aberration data 512 may be normalized to come within the expected spread of the sampled velocity data 502, such as within tolerance 520. Aberrations captured by the aberration data 512 may result due to rough road conditions, vehicle transmission shifts move the vehicle from a starting velocity to a target velocity, momentary distraction by a vehicle operator, etc.

As may also be appreciated, acceleration parameter m'1 may span more than one time interval, such as the time interval 404 and the time interval 406. In effect, the acceleration parameter m'$_1$ may be combined with the acceleration parameter m'$_2$. In this manner, the acceleration parameter m'$_1$ may keep pace with the vehicle 100 while determining constant acceleration based upon a slope of the projected linear rate-of-change velocity trend 510, which may be updated as the vehicle control unit 200 generates further sampled velocity data 502 as the vehicle 100 approaches a velocity target.

Figure 6:
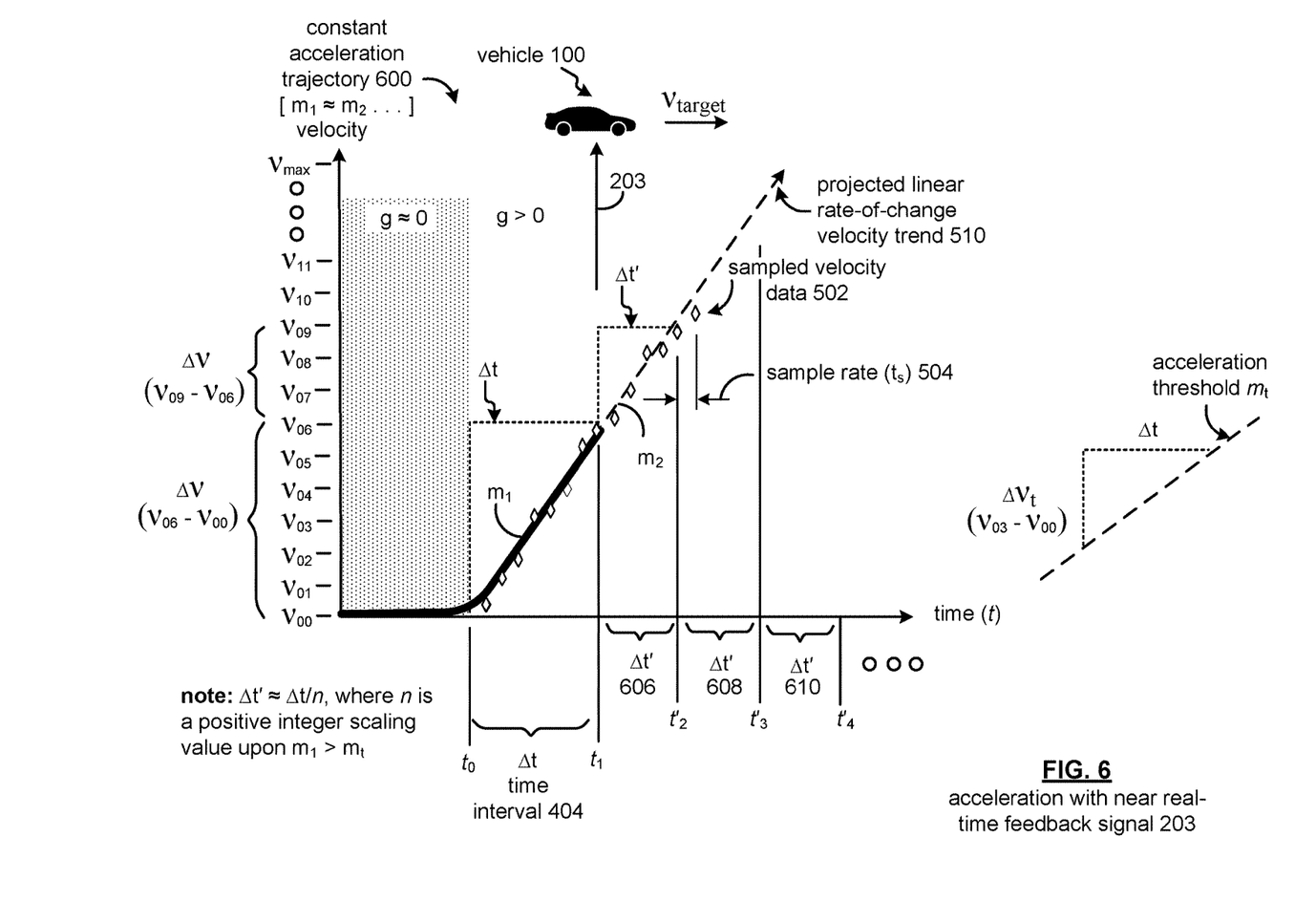
FIG. 6 is an example velocity-time graph illustrating a constant acceleration trajectory for a vehicle with the near real-time feedback signal exceeding an acceleration threshold.

FIG. 6 is an example diagram velocity-time graph illustrating a constant acceleration trajectory 600 for a vehicle 100 with the near real-time feedback signal 203 indicating a constant vehicle acceleration.

FIG. 6 illustrates sampled velocity data 502 plotted to the velocity-time graph, which is sampled during an increase in the velocity rate of the vehicle 100. The vehicle 100 began from a velocity of V$_0$, with an unknown target velocity V$_U$. The acceleration sensor device 254 senses a transition in force from a g-force of approximately zero N to a g-force greater than zero N.

As noted, the vehicle control unit 200 samples velocity data provided via the sensor data 216 at a sample rate (t$_s$) 504. As may be appreciated, the time intervals 404, 406, and 408 may be adjusted to increase or decrease the amount of sampled velocity data 502 per time interval based on the acceleration rate indicated by an acceleration parameter. In the example of FIG. 6, the acceleration rate for the vehicle exceeds an acceleration threshold m$_t$. As noted above, fuel efficiency increases with constant acceleration, and not based upon whether the acceleration is "fast" or "slow."

Because of the acceleration rate, the vehicle 100 may reach a target velocity V$_{target}$ before the vehicle control unit 200 may determine whether constant acceleration is occurring, and to provide a feedback signal 203. In this regard, the time intervals are reduced to capture the acceleration state for trajectory 600.

For example, following generation of an acceleration parameter m$_1$, which has a ΔV from V$_{00}$ to V$_{06}$ over a time interval (Δt) 404, the vehicle control unit 200 determines the acceleration rate, as indicated by the acceleration parameter m$_1$, exceeds the acceleration threshold m$_t$. In the example provided, the acceleration threshold m$_t$ has a rise of ΔV$_t$ with three velocity units (the difference of V$_{03}$ from V$_{00}$), and the time interval Δt, such as time interval 404.

The vehicle control unit 200 operates to scale subsequent time intervals to produce adjusted time intervals (Δt'). For example, the vehicle control unit 200 produces adjusted time interval 606 for time t$_1$ to t'$_2$, 608 for time t'$_2$ to t'$_3$, 610 for time t'$_3$ to t'$_4$, etc. The duration of the adjusted time intervals (Δt') may also be based upon a realistic maximum velocity V$_{max}$ for the vehicle 100. That is, the target velocity V$_{target}$ is unlikely to exceed the maximum velocity V$_{max}$.

As may also be appreciated, acceleration parameter m$_1$ may span more than one time interval, such as the time interval 404 and the adjusted time interval 606. In this manner, the acceleration parameter m$_1$ may keep pace with the vehicle 100 while determining constant acceleration based upon the projected linear rate-of-change velocity trend 510, which may be updated as the vehicle control unit 200 generates further sampled velocity data 502.

Though the adjusted time interval has a lower threshold, the accelerometer parameter m$_2$ has a value that when the acceleration is constant, will approximate the preceding acceleration parameter m$_1$ to indicate a constant acceleration. Also, the vehicle control unit 200 may compare the accelerometer parameter m$_2$ with the projected linear rate-of-change velocity trend 510 to determine whether a constant acceleration is indicated.

Figure 7:
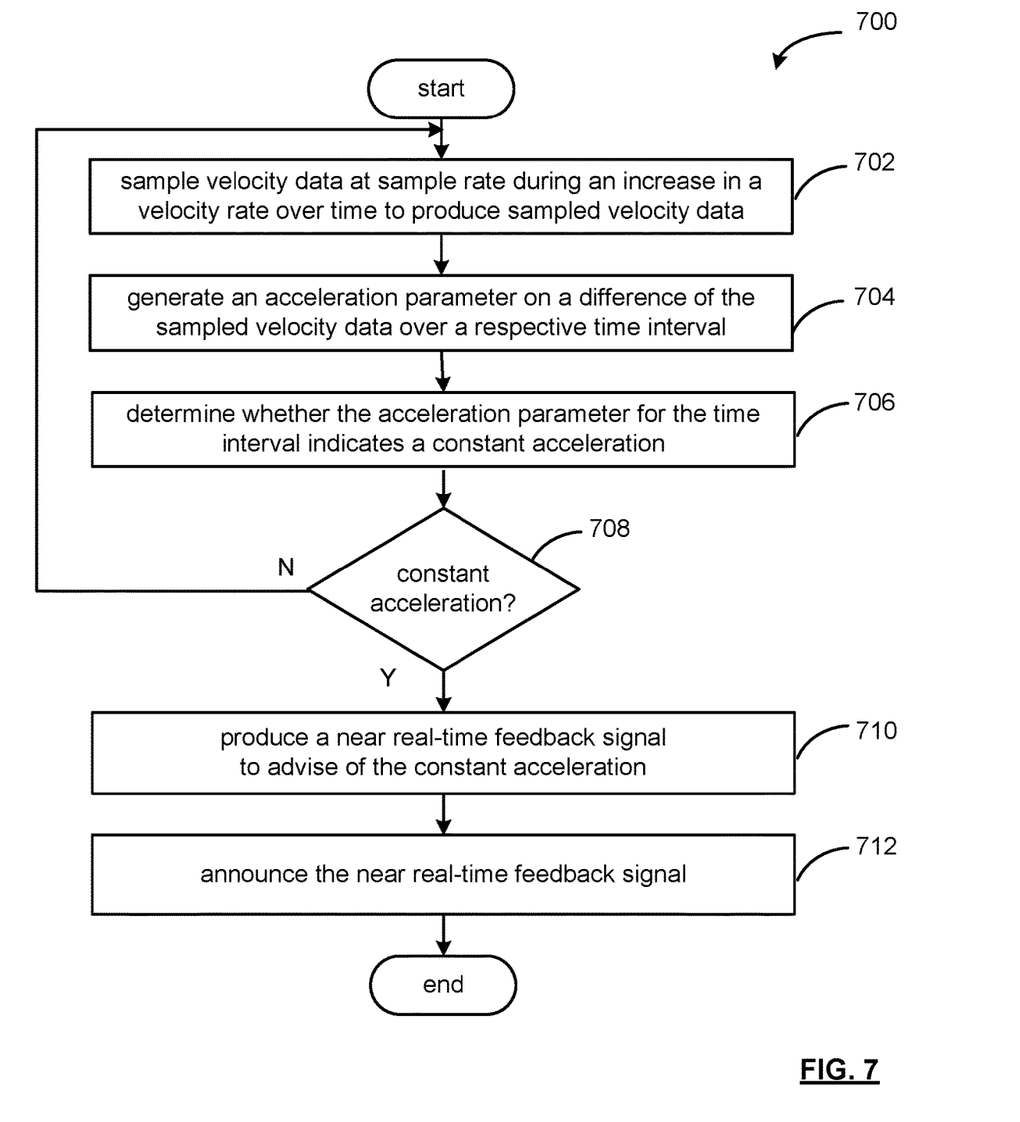
FIG. 7 is an example process in a vehicle control unit to whether an acceleration state is constant and to provide a near real-time feedback signal in response.

FIG. 7 is an example process 700 in a vehicle control unit 200 determining constant acceleration by a vehicle and providing a near real-time feedback signal in response.

In operation 702, the vehicle control unit 200, during an increase in a velocity rate, samples velocity data at given sample rate. The vehicle control unit 200 produces from the velocity data sampled velocity data during the increase in velocity rate. As may be appreciated, the vehicle control unit 200 may sense initiation (and achieving a target velocity) by an acceleration force sensed by acceleration sensor device 254 (see FIG. 2), and may receive velocity data for the vehicle 100 from the VSS device 252 (see FIG. 2).

The vehicle control unit 200, at operation 704, generates an acceleration parameter based on a difference of the sampled velocity data over a respective time interval. When the acceleration is constant, the acceleration parameter reflects a substantially linear slope. The acceleration considered in the embodiments herein are for positive acceleration parameters (such as positive slopes, and degree of slopes), wherein a negative acceleration connotes deceleration (or negative slopes and degree of slopes), such as via applying an engine brake, wheel brakes, downshifting, etc.

At operation 706, the vehicle control unit 200 determines whether the acceleration parameter indicates a constant acceleration based on a linear increase of the velocity rate over time. The determination for constant acceleration may be based on one or several bases, taking into consideration the generally brief period of time t$_0$ accelerate from a first velocity to a second, or target velocity. For example, an acceleration parameter may be assessed at successive time intervals, with each time interval having a respective acceleration parameter. When the acceleration is constant, the acceleration parameters are substantially equal.

As another example, a projected linear rate-of-change velocity trend 510 may be generated based on at least some of the sampled velocity data from a time interval. A generated acceleration parameter may then be compared with the slope of the velocity trend 510 (see, e.g., FIG. 5), and when the comparison indicates the acceleration parameter substantially equals the trend slope, the acceleration parameter indicates a constant acceleration.

In yet another example, the acceleration parameter is cumulative over time as the vehicle progresses through the increase in velocity. That is, a singular acceleration parameter may extend over multiple time intervals, which then may also use the velocity trend 510 as a reference for indicating constant acceleration. As yet another example, subsequent discrete acceleration parameters for a respective time interval may be compared against one another, or against the velocity trend 510.

When the acceleration parameter indicates a constant acceleration at operation 708, the vehicle control unit 200 produces a near real-time feedback signal 203 to advise of the constant acceleration. The near real-time feedback signal 203 provides a basis for human-machine interface (HMI) feedback. Otherwise, the vehicle control unit 200 returns to operation 702, where velocity data is sampled during an increase in a velocity rate for a vehicle 100, and continues from that time with the further velocity data provided during the velocity increase.

At operation 712, the vehicle control unit 200 announces the near real-time feedback signal 203. As noted, the target velocity is unknown. Accordingly, the feedback signal 203 provides feedback while accelerating as to the acceleration state-constant or variable.

Based on the signal, a vehicle operator receives an indication that they are operation a vehicle 100 in an improved fuel efficient mode by, at least in part, providing a constant acceleration. When an engine control unit 240 (see FIG. 2) receives the feedback signal, the engine control unit 240 may act on the feedback to affect throttle, transmission, and other power train systems to remain within a constant acceleration mode of operation (or economy mode of operation generally).

Also, the near real-time feedback signal 203 may be announced via a visual indicator signal, such as a vehicle control panel, head unit device, instrument cluster, via a haptic indication signal (that is, vibration), such as a vehicle control surface, seat, handheld mobile device, etc., and also via an audible indication signal from various speaker units or chimes of the vehicle, as well as through personal devices such as a handheld mobile device. As may be appreciated, the vehicle control unit 200 may communicate using wireless transmissions, either in the context of near field, or generally, such as under 4G/LTE technologies, as discussed in detail with reference to FIG. 2.

While particular combinations of various functions and features of the present invention have been expressly described herein, other combinations of these features and functions are possible that are not limited by the particular examples disclosed herein are expressly incorporated within the scope of the present invention.

As one of ordinary skill in the art may appreciate, the term "substantially" or "approximately," as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items range from a difference of a few percent to magnitude differences. As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled." As one of ordinary skill in the art will further appreciate, the term "compares favorably," as may be used herein, indicates that a comparison between two or more elements, items, signals, et cetera, provides a desired relationship.

As the term "module" may be used in the description of the drawings, a module includes a functional block that is implemented in hardware, software, and/or firmware that performs one or more functions such as the processing of an input signal to produce an output signal. As used herein, a module may contain submodules that themselves are modules.

Thus, there has been described herein an apparatus and method, as well as several embodiments, for implementing a method in a vehicle control unit for improving a fuel efficiency of a vehicle, by providing a feedback relating to a constant acceleration of the vehicle from a first velocity to a second velocity.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretations so as to encompass all such modifications and equivalent structures as is permitted under the law.

What is claimed is:

1. A method in a vehicle control unit, the method comprising:
   sampling velocity data at sample rate during an increase in a velocity rate over time to produce a plurality of sampled velocity data;
   generating an acceleration parameter based on a difference of the sampled velocity data over a respective time interval;
   determining whether the acceleration parameter indicates a constant acceleration based on a linear increase trajectory of the velocity rate over time; and
   when the acceleration parameter indicates the constant acceleration:
      producing a near real-time feedback signal to advise of the constant acceleration; and
      announcing, via an instrument cluster assembly, the near real-time feedback signal for affecting a vehicle operator's acceleration behavior to maintain a desirable constant acceleration rate.

2. The method of claim 1, wherein the determining whether the acceleration parameter indicates the constant acceleration comprises:
   comparing the acceleration parameter with a projected linear rate-of-change velocity trend being based on at least in part on some of the plurality of the sampled velocity data over the respective time interval.

3. The method of claim 1, further comprising:
   scaling respective ones of a plurality of respective time intervals to an adjusted respective time interval based on an initial acceleration parameter exceeding a threshold for an initial time interval.

4. The method of claim 1, wherein the acceleration parameter is a positive acceleration parameter.

5. The method of claim 1, further comprising:
   sensing the increase in the velocity rate over time by an accelerometer sensor device.

6. The method of claim 5, wherein the accelerometer sensor device comprises at least one of:
- a capacitative accelerometer;
- a piezoelectric accelerometer;
- a semiconductor accelerometer; and
- a hall-effect accelerometer.

7. The method of claim 1, wherein the announcing the near real-time feedback signal comprises at least one of:
- displaying a visual indicator;
- providing a haptic indication; and
- providing an audible indication.

8. A method in a vehicle control unit, the method comprising:
- sensing an increase in a velocity rate over time;
- sampling velocity data at a sample rate during the increase in the velocity rate over time to produce a plurality of sampled velocity data;
- generating an initial acceleration parameter for a first time interval, wherein the initial acceleration parameter reflects a difference of the sampled velocity data over the first time interval;
- generating a subsequent acceleration parameter based on the difference of the sampled velocity data over a second time interval;
- determining whether the subsequent acceleration parameter indicates constant acceleration based on a linear increase trajectory in the velocity rate over time with respect to the initial acceleration parameter; and
- when the subsequent acceleration parameter indicates the constant acceleration:
  - producing a near real-time feedback signal to advise of the constant acceleration; and
  - announcing, via an instrument cluster assembly, the near real-time feedback signal for affecting a vehicle operator's acceleration behavior.

9. The method of claim 8, wherein the determining whether the subsequent acceleration parameter indicates the constant acceleration comprises:
- comparing the subsequent acceleration parameter with a projected linear rate-of-change velocity trend being based on at least in part on the initial acceleration parameter.

10. The method of claim 8, further comprising:
- normalizing the plurality of the sampled velocity data to minimize aberrations in the plurality of sampled velocity data produced under different operational conditions.

11. The method of claim 8, further comprising:
- sensing the increase in the velocity rate over time with an accelerometer sensor device.

12. The method of claim 11, wherein the accelerometer sensor device comprises at least one of:
- a capacitative accelerometer;
- a piezoelectric accelerometer;
- a semiconductor accelerometer; and
- a hall-effect accelerometer.

13. The method of claim 8, wherein the announcing the near real-time feedback signal comprises at least one of:
- providing a visual indication signal;
- providing a haptic indication signal to either of a vehicle control surface and a handheld user device; and
- providing a resistance indication signal to either of a vehicle control surface and a handheld user device.

14. A vehicle control unit comprising:
- a wireless communication interface to service communication with a handheld user device of a vehicle user and with a vehicle network;
- a processor coupled to the wireless communication interface and in communication with a vehicle speed sensor device, the processor for controlling operations of the vehicle control unit; and
- a memory coupled to the processor, the memory for storing data and program instructions used by the processor, the processor configured to execute instructions stored in the memory to:
  - sample velocity data, produced by the vehicle speed sensor device, at sample rate during an increase in a velocity rate over time $t_0$ produce a plurality of sampled velocity data;
  - generate an acceleration parameter for a time interval, wherein the acceleration parameter reflects a difference of the sampled velocity data with respect to the time interval;
  - determine whether the acceleration parameter indicates constant acceleration based on a linear increase trajectory in the velocity rate over time; and
  - when the acceleration parameter indicates the constant acceleration:
    - produce a near real-time feedback signal to advise of the constant acceleration; and
    - announce the near real-time feedback signal via the wireless communication interface for receipt by the handheld user device of the vehicle user to affect a vehicle operator's acceleration behavior to maintain a desirable constant acceleration rate.

15. The vehicle control unit of claim 14, wherein the processor is further configured to execute instructions stored in the memory to determine whether the acceleration parameter indicates the constant acceleration by:
- comparing the acceleration parameter with a slope of a projected linear rate-of-change velocity trend based on at least some of the plurality of the sampled velocity data.

16. The vehicle control unit of claim 14, wherein the processor is further configured to execute instructions stored in the memory to scale a subsequent time interval to an adjusted time interval based on the acceleration parameter exceeding a threshold for the time interval.

17. The vehicle control unit of claim 14, wherein the acceleration parameter comprises a positive acceleration parameter.

18. The vehicle control unit of claim 14, wherein the processor is in communication with an acceleration sensor device to sense the increase in the velocity rate over time.

19. The vehicle control unit of claim 18, wherein the acceleration sensor device comprises at least one of:
- a capacitative accelerometer;
- a piezoelectric accelerometer;
- a semiconductor accelerometer; and
- a hall-effect accelerometer.

20. The vehicle control unit of claim 14, wherein the processor is further configured to execute further instructions stored in the memory to announce the near real-time feedback signal by at least one of:
- displaying a visual indicator;
- providing a haptic indication to either of a vehicle control surface and the handheld user device; and
- providing a resistance indication to either of the vehicle control surface and the handheld user device.

* * * * *